United States Patent
Nakajima

(10) Patent No.: US 10,668,775 B2
(45) Date of Patent: Jun. 2, 2020

(54) TIRE

(71) Applicant: Sumitomo Rubber Industries, Ltd., Kobe-shi, Hyogo (JP)

(72) Inventor: Sho Nakajima, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 326 days.

(21) Appl. No.: 15/587,074

(22) Filed: May 4, 2017

(65) Prior Publication Data

US 2017/0341472 A1 Nov. 30, 2017

(30) Foreign Application Priority Data

May 25, 2016 (JP) .................. 2016-104503

(51) Int. Cl.
*B60C 11/03* (2006.01)
*B60C 11/12* (2006.01)
*B60C 11/11* (2006.01)

(52) U.S. Cl.
CPC ...... *B60C 11/0306* (2013.01); *B60C 11/0302* (2013.01); *B60C 11/0304* (2013.01);
(Continued)

(58) Field of Classification Search
CPC . B60C 11/0304; B60C 11/11; B60C 11/0306; B60C 11/0309; B60C 11/0302;
(Continued)

(56) References Cited

U.S. PATENT DOCUMENTS

2012/0261044 A1* 10/2012 Numata .............. B60C 11/0304
152/209.8
2013/0087261 A1 4/2013 Kageyama
(Continued)

FOREIGN PATENT DOCUMENTS

DE 202008018041 U1 6/2011
EP 2138327 A1 12/2009
(Continued)

OTHER PUBLICATIONS

Machine translation of EP2881264 (no date).*
(Continued)

*Primary Examiner* — Steven D Maki
*Assistant Examiner* — Philip N Schwartz
(74) *Attorney, Agent, or Firm* — Birch, Stewart, Kolasch & Birch, LLP

(57) ABSTRACT

A tire 1 comprises a tread portion 2 provided with an outer shoulder main groove 3 in a part closest to an outside tread edge (To) and an outer crown main groove 4 on a side of an inside tread edge (Ti) of the outer shoulder main groove 3 both extending continuously in the tire circumferential direction, and outer transverse grooves 9 connecting between the outside tread edge (To) and the outer crown main groove 4 so that an outer shoulder land region 7A is defined between the outside tread edge (To) and the outer shoulder main groove 3 and an outer middle land region 7B is defined between the outer shoulder main groove 3 and the outer crown main groove 4. A maximum axial width Ws of the outer shoulder land region 7A is larger than a maximum axial width Wm of the outer middle land region 7B.

19 Claims, 5 Drawing Sheets

(52) U.S. Cl.
CPC ....... *B60C 11/0311* (2013.01); *B60C 11/1204* (2013.01); *B60C 11/1236* (2013.01); *B60C 11/11* (2013.01); *B60C 2011/0341* (2013.01); *B60C 2011/0346* (2013.01); *B60C 2011/0353* (2013.01); *B60C 2011/0358* (2013.01); *B60C 2011/0365* (2013.01); *B60C 2011/0369* (2013.01); *B60C 2011/0376* (2013.01); *B60C 2011/0379* (2013.01); *B60C 2011/1213* (2013.01)

(58) Field of Classification Search
CPC ............. B60C 11/1204; B60C 11/1236; B60C 11/0311; B60C 2011/0379; B60C 2011/0365; B60C 2011/1213; B60C 2011/0353; B60C 2011/0346; B60C 2011/0341; B60C 2011/0358; B60C 2011/0369; B60C 2011/0376
See application file for complete search history.

(56) References Cited

U.S. PATENT DOCUMENTS

2013/0269846 A1* 10/2013 Koyama et al. ........ B60C 11/03
152/209.18
2013/0306208 A1 11/2013 Kageyama

FOREIGN PATENT DOCUMENTS

| EP | 2193935 A1 | 6/2010 | |
|----|------------|--------|---|
| EP | 2511107 A2 | 10/2012 | |
| EP | 2610082 A2 | 7/2013 | |
| EP | 2881264 A1 | 6/2015 | |
| EP | 3081397 A1 | 10/2016 | |
| EP | 3093162 A1 | 11/2016 | |
| JP | 05024416 A * | 2/1993 | ............. B60C 11/04 |
| JP | 0671288 A1 | 9/1995 | |
| JP | 2007161123 A * | 6/2007 | ............. B60C 11/04 |
| JP | 2007-230251 A | 9/2007 | |
| JP | 2013-237360 A | 11/2013 | |
| WO | WO 2016/121858 A1 | 8/2016 | |

OTHER PUBLICATIONS

Machine translation of JP05-024416 (no date).*
Extended European Search Report, dated Oct. 11, 2017, for European Application No. 17169545.5.

* cited by examiner

TIRE

TECHNICAL FIELD

The present invention relates to a tire having improved on-snow performance and steering stability.

In recent years, opportunities to drive with winter pneumatic tires not only on snowy and icy roads, but also on dry roads and the like are increasing. Therefore, in such pneumatic tires for winter, it is required to improve not only on-snow performance but also steering stability at a high level in a good balance.

For example, in order to improve the on-snow performance, it has been proposed to increase a groove width and a groove depth of a transverse groove, etc. in order to increase shearing force obtained by the transverse groove. However, with this method, since a ground contacting area and pattern rigidity are decreased, therefore, fractional force on a dry road is decreased and the steering stability is deteriorated. In this way, the on-snow performance and the steering stability have reciprocal relationships, and thus it has been difficult to improve these performances in a good balance. Related technologies are disclosed in Japanese Patent Application Publication No. 2013-237360.

SUMMARY OF THE INVENTION

The present invention was made in view of the above, and a primary object thereof is to provide a tire capable of improving the on-snow performance and the steering stability.

In one aspect of the present invention, a tire comprises a tread portion having a designated mounting direction to a vehicle to define an outside tread edge located toward the outside of the vehicle when the tire is mounted on the vehicle and an inside tread edge located toward the inside of the vehicle when the tire is mounted on the vehicle, wherein.

the tread portion is provided with an outer shoulder main groove extending continuously in the tire circumferential direction in a part closest to the outside tread edge, an outer crown main groove extending continuously in the tire circumferential direction on a side of the inside tread edge of the outer shoulder main groove, a plurality of outer transverse grooves connecting between the outside tread edge and the outer crown main groove, an outer shoulder land region defined between the outside tread edge and the outer shoulder main groove, and an outer middle land region defined between the outer shoulder main groove and the outer crown main groove, and a maximum width of the outer shoulder land region in the tire axial direction is larger than a maximum width of the outer middle land region in the tire axial direction.

In another aspect of the invention, it is preferred that the maximum width of the outer middle land region in the tire axial direction is in a range from 70% to 85% of the maximum width of the outer shoulder lard region in the tire axial direction.

In another aspect of the invention, it is preferred that a groove width of at least one of the outer transverse grooves gradually decreases toward the inside tread edge.

In another aspect of the invention, it is preferred that at least one of the outer transverse grooves is provided with a shallow bottom portion having a smaller groove depth than the rest of the at least one of the outer transverse grooves and extending toward the outside tread edge from a position where the at least one of the outer transverse grooves is connected with the outer crown main groove.

In another aspect of the invention, it is preferred that the outer shoulder main groove has a zigzag configuration in which first portions inclined to one side with respect to the tire circumferential direction and second portions inclined to the opposite direction to the first portions are arranged alternately in the tire circumferential direction, and each of the outer transverse grooves extends through one of intersections between the first portions and the second portions.

In another aspect of the invention, it is preferred that the tread portion is further provided with an inner crown main groove extending continuously in the tire circumferential direction on the side of the inside tread edge of the outer crown main groove, and an inner shoulder main groove extending continuously in the tire circumferential direction on the side of the inside tread edge of the inner crown main groove, and a groove width of the outer shoulder main groove is smaller than groove widths of the outer crown main groove, the inner crown main groove and the inner shoulder main groove.

In another aspect of the invention, it is preferred that the outer shoulder land region is divided by the plurality of the outer transverse grooves into outer shoulder blocks arranged in the tire circumferential direction, at least some of the outer shoulder blocks are each provided with an outer circumferential narrow groove connecting between a pair of the outer transverse grooves adjacently disposed to each other on both sides of each of the at least some of the outer shoulder blocks in the tire circumferential direction, the outer circumferential narrow groove comprises a first oblique portion inclined to one side with respect to the tire circumferential direction with a length not less than 30% of a maximum length of corresponding one of the some of the outer shoulder blocks in the tire circumferential direction, and a second oblique portion inclined to an opposite direction to the first oblique portion with a length not less than 30% of the maximum length of the corresponding one of the some of the outer shoulder block in the tire circumferential direction.

In another aspect of the invention, it is preferred that at least one of the outer transverse grooves comprises a pair of groove edges extending in the tire axial direction, one of the pair of the groove edges comprises a first groove edge portion extending smoothly in the tire axial direction and a second groove edge portion connected with the first groove edge portion and inclined toward a groove center line of the at least one of the outer transverse grooves at a greater angle than the first groove edge portion, the other one of the pair of the groove edges comprises a third groove edge portion extending smoothly in the tire axial direction and a fourth groove edge portion connected with the third groove edge portion and inclined toward the groove center line at a greater angle than the third groove edge portion, and the second groove edge portion and the fourth groove edge portion are misaligned in the tire axial direction.

In another aspect of the invention, it is preferred that the tread portion is further provided with a plurality of crown transverse grooves extending from the outer crown main groove toward the inside tread edge and inclined to one side with respect to the tire axial direction, and a plurality of outer middle transverse grooves connecting between the outer crown main groove and the outer shoulder main groove, and the crown transverse grooves are inclined to the opposite direction to the outer middle transverse grooves.

DESCRIPTION OF THE PREFERRED EMBODIMENTS

An embodiment of the present invention will now be described in conjunction with accompanying drawings.

Figure 1:
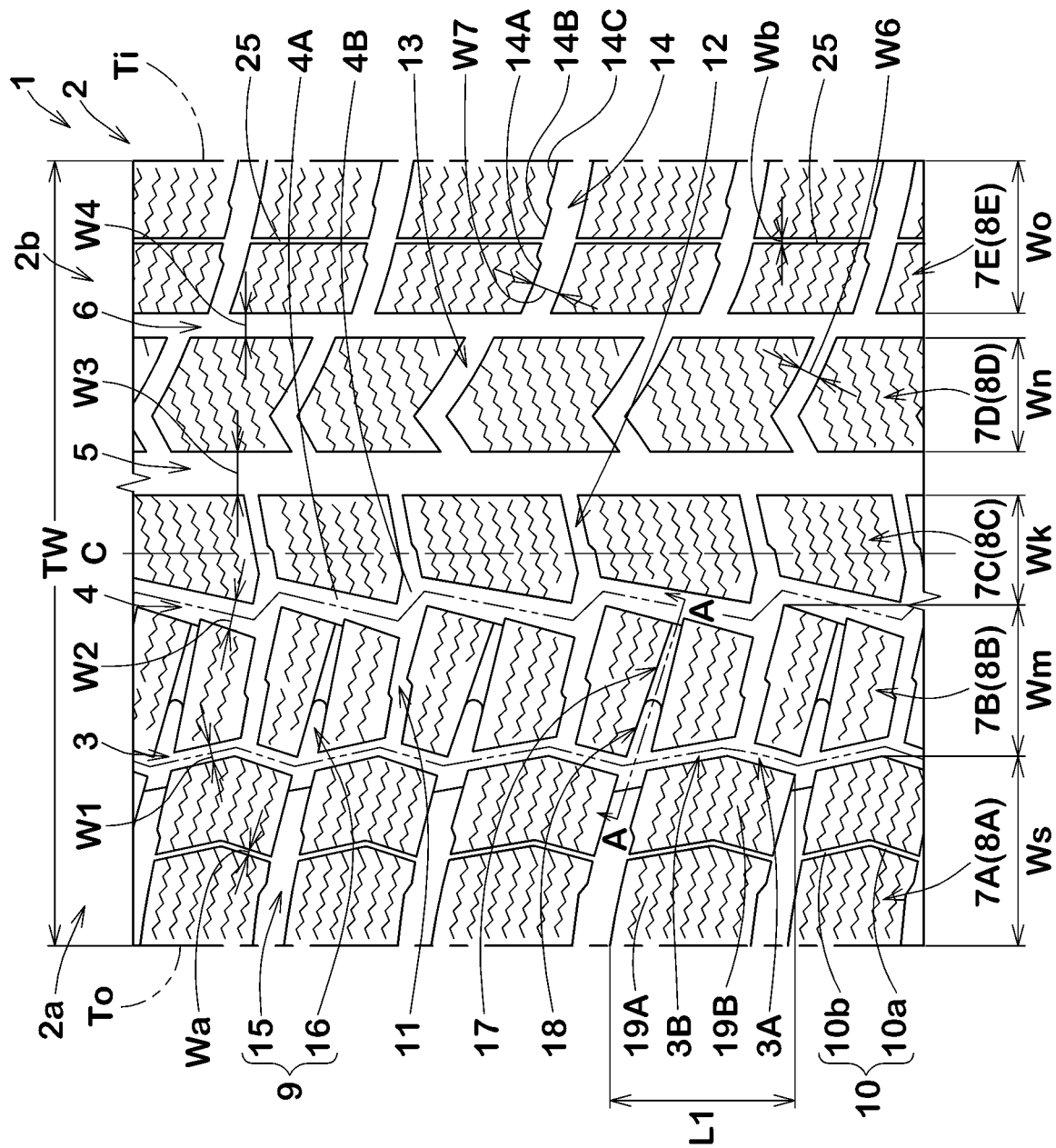
FIG. 1 is a development view of the tread portion of a tire as an embodiment of the present invention.

FIG. 1 is a development view of a tread portion 2 of a tire 1 as an embodiment of the present invention. The tire 1 in this embodiment can be used for various tires such as a pneumatic tire for a passenger car and for heavy duty and a non-pneumatic tire which is not filled with pressurized air inside the tire, for example. The tire 1 in this embodiment is suitably used as a pneumatic tire for passenger cars.

As shown in FIG. 1, the tread portion 2 is provided with an asymmetric tread pattern having a designated mounting direction to a vehicle. The tread portion 2 is provided with an outside tread edge (To) located toward the outside of the vehicle when the tire 1 is mounted on the vehicle and an inside tread edge (Ti) located toward the inside of the vehicle when the tire 1 is mounted on the vehicle. The tread portion 2 is divided into an outer tread portion 2a located on a side of the outside tread edge (To) of the tire equator C and an inner tread portion 2b located on a side of the inside tread edge (Ti) of the tire equator C. The mounting direction to the vehicle is indicated, for example, on a sidewall portion (not shown in the Figs) by characters or the like.

The "tread edges" (To) and (Ti) are defined as axially outermost ground contacting positions when the tire 1 in the standard state mounted on the standard rim and inflated to the standard pressure with no tire load and then is in contact with a flat surface with zero camber angle by being loaded with a standard tire load. The distance between the outside tread edge (To) and the inside tread edge (Ti) in the tire axial direction is determined as a tread width TW. Sizes and the like of various parts of the tire are those measured in the standard state unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO. If the concerned tire is for passenger cars, the standard pressure is 180 kPa. If there is no corresponding standard for the concerned tire as in a racing tire, a wheel rim and air pressure which the tire's manufacturer recommends are respectively used.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. If the concerned tire is for passenger cars, the standard load is 88% of the above-mentioned load.

As shown in FIG. 1, the tread portion 2 in this embodiment is provided with an outer shoulder main groove 3, an outer crown main groove 4, an inner crown main groove 5, and an inner shoulder main groove 6. The outer shoulder main groove 3 and the outer crown main groove 4 in this embodiment are provided in the outer tread portion 2a. The inner crown main groove 5 and the inner shoulder main groove 6 in this embodiment are provided in the inner tread portion 2b.

The outer shoulder main groove 3 is arranged closest to the outside tread edge (To) and extends continuously in the tire circumferential direction. The outer shoulder main groove 3 in this embodiment has a zigzag configuration in which first portions 3A inclined to one side with respect to the tire circumferential direction and second portions 3B inclined to the opposite direction to the first portions 3A are arranged alternately in the tire circumferential direction. The outer shoulder main groove 3 configured as such has tire-axial-direction components, therefore, it exerts a shearing force.

The outer crown main groove 4 extends continuously in the tire circumferential direction on the side of the inside tread edge (Ti) of the outer shoulder main groove 3. The outer crown main groove 4 in this embodiment has A zigzag configuration in which long side portions 4A inclined to one side with respect to the tire circumferential direction and short side portions 4B inclined to the opposite direction to the long side portions 4A and having a smaller length than the long side portions 4A in the tire circumferential direction are arranged alternately in the tire circumferential direction. The outer crown main groove 4 configured as such also has the tire-axial-direction components, therefore, it exerts a shearing force.

Figure 2:
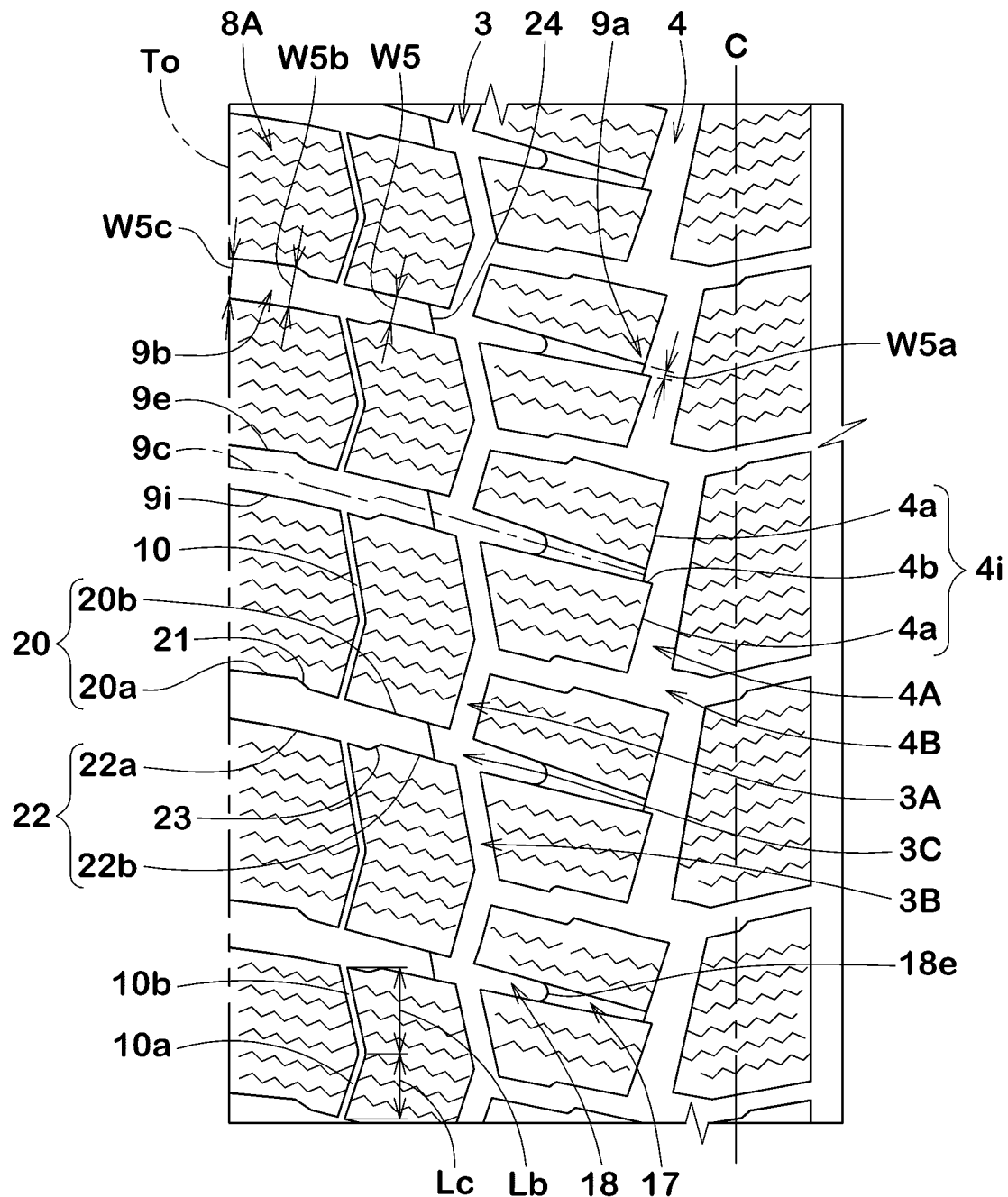
FIG. 2 is an enlarged view of the outside tread portion in FIG. 1.

As shown in FIG. 2, the long side portions 4A of the outer crown main groove 4 are each formed such that a groove edge 4i on the side of the outside tread edge (To) includes a plurality of long edge portions 4a extending obliquely to one side in the tire circumferential direction and a short edge portion 4b connecting between the long edge portions 4a and having a smaller length in the tire circumferential direction than the long edge portions 4a. The short edge portion 4b is inclined to the opposite direction to the long edge portions 4a. The long side portions 4A configured as such has the increased tire-axial-direction components, therefore, the on-snow performance can be further improved.

As shown in FIG. 1, the inner crown main groove 5 in this embodiment extends continuously in the tire circumferential direction on the side of the inside tread edge (Ti) of the outer crown main groove 4. The inner crown main groove 5 extends straight, for example. The inner crown main groove 5 configured as such increases the rigidity of the land regions on both sides in the tire axial direction, suppresses unstable behaviors such as wobbling and drifting of the vehicle at the time of braking, and therefore improves the steering stability.

The inner shoulder main groove 6 in this embodiment extends continuously in the tire circumferential direction between the inside tread edge (Ti) and the inner crown main groove 5. The inner shoulder main groove 6 extends straight, for example. The inner shoulder main groove 6 configured as such also increases the rigidity of the land regions on both sides in the tire axial direction, suppresses unstable behaviors such as wobbling and drifting of the vehicle at the time of braking, and therefore improves the steering stability.

It is preferred that a groove width W1 of the outer shoulder main groove 3 is smaller than a groove width W2 of the outer crown main groove 4, a groove width W3 of the inner crown main groove 5, and a groove width W4 of the inner shoulder main groove 6. Thereby, the rigidity is increased in the land regions, to which a large lateral force is applied during cornering on both sides of the outer shoulder main groove 3, therefore, the steering stability is improved.

From a similar point of view, it is preferred that the groove width W4 of the inner shoulder main groove 6 is smaller than the groove width W2 of the outer crown main groove 4 and the groove width W3 of the inner crown main groove 5.

In order to improve the steering stability and the on-snow performance in a good balance, it is preferred that the groove width W1 of the outer shoulder main groove 3 is 1% to 4% of the tread width TW. It is preferred that the groove width W4 of the inner shoulder main groove 6 is 2% to 5% of the tread width TW. It is preferred that the groove width W2 of the outer crown main groove 4 and the groove width W3 of the inner crown main groove 5 are 3% to 9% of the tread width TW. It is preferred that a groove depth D1 (shown in FIG. 3) of the outer shoulder main groove 3, a groove depth D2 (shown in FIG. 3) of the outer crown main groove 4, a groove depth of the inner crown main groove 5 and a groove depth (not shown in the Figs) of the inner shoulder main groove 6 is 5 to 12 mm, for example.

The tread portion 2 is provided with an outer shoulder land region 7A, an outer middle land region 7B, a crown land region 7C, an inner middle land region 7D, and an inner shoulder land region 7E divided by the main grooves 3 to 6 configured as such. The outer shoulder land region 7A is defined between the outside tread edge (To) and the outer shoulder main groove 3. The outer middle land region 7B is defined between the outer shoulder main groove 3 and the outer crown main groove 4. The crown land region 7C is defined between the outer crown main groove 4 and the inner crown main groove 5. The inner middle land region 7D is defined between the inner shoulder main groove 6 and the inner crown main groove 5. The inner shoulder land region 7E is defined between the inner shoulder main groove 6 and the inside tread edge (Ti).

A maximum width Ws of the outer shoulder land region 7A in the tire axial direction is larger than a maximum width Wm of the outer middle land region 7B in the tire axial direction. Thereby, the lateral rigidity is secured at a high level in the outer shoulder land region 7A to which a large lateral force is applied during cornering, therefore, the steering stability is improved. If the maximum width Ws of the outer shoulder land region 7A is excessively larger than the maximum width Wm of the outer middle land region 7B, the lateral rigidity of the outer middle land region 7B is decreased, therefore, it is possible that the steering stability is rather deteriorated. Thereby, it is preferred that the maximum width Wm of the outer middle land region 7B is 70% to 85% of the maximum width Ws of the outer shoulder land region 7A.

From a similar point of view, it is preferred that the maximum width Ws of the outer shoulder land region 7A is 20% to 30% of the tread width TW.

It is preferred that a maximum width Wo of the inner shoulder land region 7E in the tire axial direction is larger than a maximum width Wn of the inner middle land region 7D in the tire axial direction. Further, it is preferred that the maximum width Wn of the inner middle land region 7D is 70% to 85% of the maximum width Wo of the inner shoulder land region 7E. Thereby, the lateral rigidity is secured at a high level in the inner shoulder land region 7E, therefore, the steering stability is further improved.

The outer shoulder land region 7A is provided with a plurality of outer transverse grooves 9 extending from the outside tread edge (To) toward the inside tread edge (Ti) beyond the outer shoulder main groove 3, and a plurality of outer circumferential narrow grooves 10 each connecting between one of at least some pairs of the outer transverse grooves 9 adjacent in the tire circumferential direction. Thereby, the outer shoulder land region 7A is provided with outer shoulder blocks 8A, each defined between adjacent ones of the outer transverse grooves 9, arranged in the tire circumferential direction. At least some of the outer shoulder blocks 8A are divided into outer block portions 19A on the side of the outside tread edge (To) of the outer circumferential narrow grooves 10 and inner block portions 19B on a side of the tire equator C of the outer circumferential narrow grooves 10. The outer circumferential narrow grooves 10 in this embodiment have groove widths Wa of about 1.2 to 1.8 mm and groove depths (not shown in the Figs) of about 1.5 to 2.5 mm.

The outer transverse grooves 9 extend to the outer crown main groove 4. The outer transverse grooves 9 configured as such can form a large snow block, therefore, a large shearing force is exerted. Further, the outer transverse grooves 9 are provided in the outer tread portion 2a to which a particularly large lateral force is applied. Thereby, high traction is exerted during cornering when a large lateral force acts, therefore, the on-snow performance is improved.

The outer transverse grooves 9 include outer portions 15 disposed between the outside tread edge (To) and the outer shoulder main groove 3, and inner portions 16 disposed between the outer shoulder main groove 3 and the outer crown main groove 4.

Figure 3:
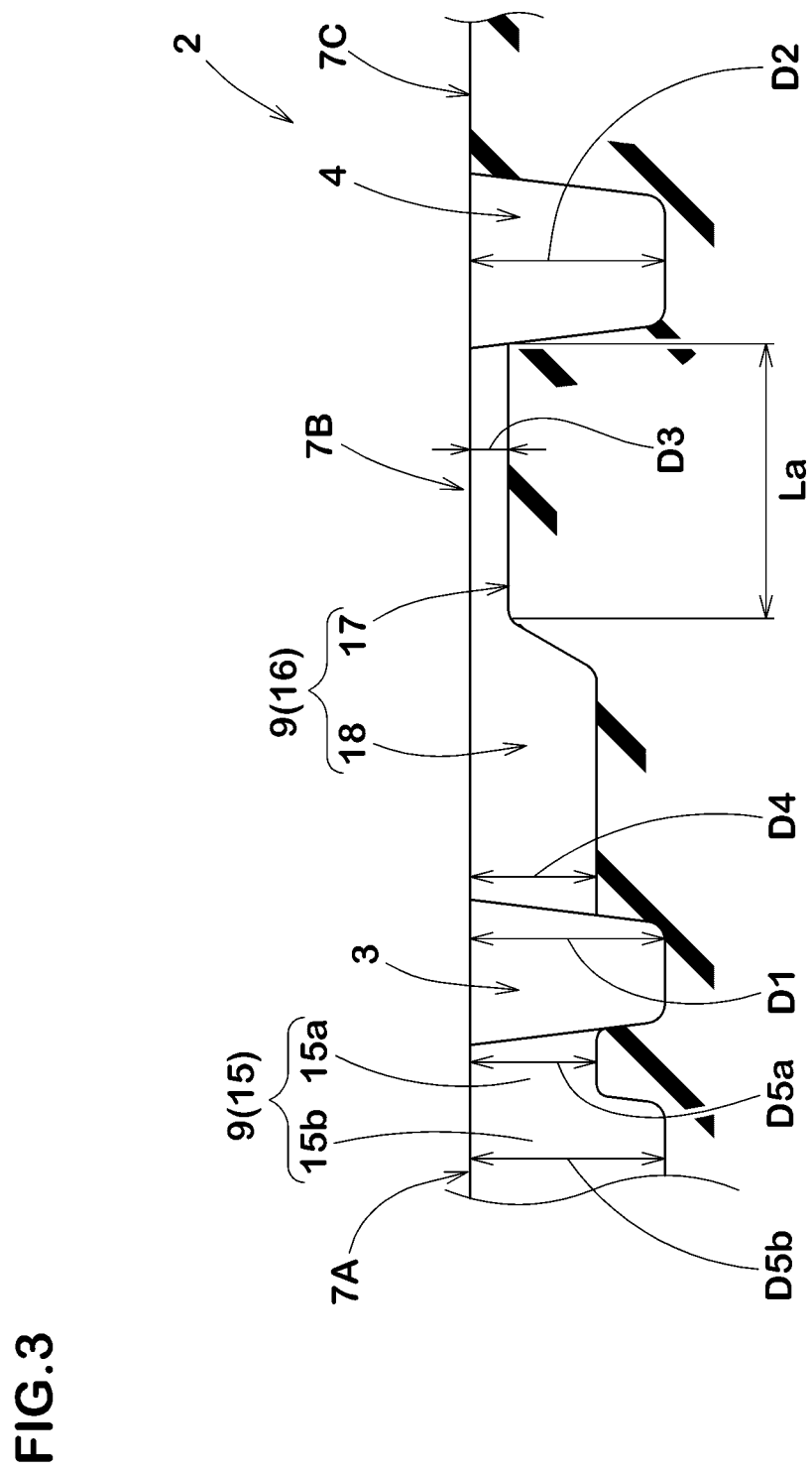
FIG. 3 is a sectional view taken along A-A line in FIG. 1.

FIG. 3 is a cross-sectional view taken along A-A line in FIG. 1. As shown in FIG. 3, at least one of the outer transverse grooves 9 includes a shallow bottom portion 17 having a smaller groove depth than the rest of the at least one of the outer transverse grooves 9 and extending toward the outside tread edge (To) from a position where the at least one of the outer transverse grooves is connected with the outer crown main groove 4, and a deep bottom portion 18 disposed on the side of the outside tread edge (To) of the shallow bottom portion 17. The at least one of the outer transverse grooves 9 configured as such suppresses an excessive decrease in the rigidity of the outer tread portion 2a and maintains the steering stability at a high level. The shallow bottom portion 17 and the deep bottom portion 18 are provided in the corresponding one of the inner portions 16.

It is preferred that a groove depth D3 of the shallow bottom portion 17 is 20% to 40% of a groove depth D4 of the deep bottom portion 18. If the groove depth D3 of the shallow bottom portion 17 is less than 20% of that of the deep bottom portion 18, a size of a snow block formed therein is decreased, therefore, it is possible that the on-snow performance cannot be improved. If the groove depth D3 of the shallow bottom portion 17 is greater than 40% of that of the deep bottom portion 18, the rigidity of the outer middle land region 7B is decreased, therefore, it is possible that the steering stability is deteriorated. Although not particularly limited, it is preferred that the groove depth D4 of the deep bottom portion 18 is 55% to 75% of the groove depth D1 of the outer shoulder main groove 3.

In order to effectively exert the above-described effects, a length La of the shallow bottom portion 17 in the tire axial direction is 40% to 60% of the maximum width Wm of the outer middle land region 7B.

A groove bottom edge 18e of the deep bottom portion 18 on the axially inside is formed in an arc shape convex axially inwardly. The groove bottom edge 18e configured as such can form a large snow block while maintaining the rigidity of the outer middle land region 7B at a high level, therefore, the steering stability and the on-snow performance are improved.

The outer portion 15 includes a shallow groove portion 15a extending from the outer shoulder main groove 3 toward the outside tread edge (To) and a deep groove portion 15b connecting between the shallow groove portion 15a and the outside tread edge (To) and having a larger groove depth than the shallow groove portion 15a. Thereby, snow can be effectively discharged at the outside tread edge (To), and the rigidity of the outer shoulder land region 7A in the vicinity of the outer shoulder main groove 3 is maintained at a high level, therefore, excellent steering stability is exerted. From this point of view, it is preferred that, a groove depth D5a of the shallow groove portion 15a is 45% to 60% of a groove depth D5b of the deep groove portion 15b.

A groove bottom edge 24 on the axially inside of the deep groove portion 15b extends straight. Thereby, a large shearing force is exerted. The groove bottom edge 18e in this embodiment on the axially inside of the deep bottom portion 18 is formed in an arc shape and the groove bottom edge 24 in this embodiment on the axially inside of the deep groove portion 15b disposed axially outside the deep bottom portion 18 is formed in a straight line.

As shown in FIG. 2, a groove width W5 of at least one of the outer transverse grooves 9 gradually decreases toward the inside tread edge (Ti). The at least one of the outer transverse grooves 9 in this embodiment includes a minimum width portion 9a having a minimum groove width W5a disposed closest to the inside tread edge (Ti) and a maximum width portion 9b having a maximum groove width W5b. The outer transverse grooves 9 configured as such can smoothly discharge the snow in the outer transverse grooves 9 at the maximum width portion 9b while suppressing a decrease in the rigidity of the outer middle land region 7B. If the groove width W5a of the minimum width portion 9a is small, it is possible that the shear force is decreased. If the groove width W5b of the maximum width portion 9b is large, it is possible that the rigidity of the outer shoulder land region 7A is excessively decreased. Thereby, it is preferred that a ratio (W5a/W5b) of the minimum groove width W5a and the maximum groove width W5b is 30% to 50%. The groove width W5 of one of the outer transverse grooves 9 is a distance in a direction orthogonal to a groove center line 9c between a pair of groove edges 9e and 9i extending in the tire axial direction. The groove center line 9c is represented by a line segment smoothly connecting intermediate positions of lengths in the tire circumferential direction between the groove edges 9e and 9i.

At least one of the outer transverse grooves 9 in this embodiment is provided with the maximum width portion 9b between the outside tread edge (To) and the outer circumferential narrow grooves 10. Further, a groove width W5c of the at least one of the outer transverse grooves 9 at a connecting position with the outside tread edge (To) is 90% of the groove width W5b of the maximum width portion 9b, and the groove width gradually increases toward the maximum width portion 9b. Thereby, the at least one of the outer transverse grooves 9 has a substantially increasing groove width W5 from the minimum width portion 9a to the outside tread edge (To) in its longitudinal direction, therefore, the snow in the at least one of the outer transverse grooves 9 is smoothly discharged from the outside tread edge (To), thus the above-described effects are effectively exerted.

One of the groove edges (the upper groove edge 9e in the Figs) of at least one of the outer transverse grooves 9 has a first groove edge portion 20 extending smoothly in the tire axial direction, and a second groove edge portion 21 connected with the first groove edge portion 20 and inclined toward the groove center line 9c of the at least one of the outer transverse grooves 9 at a greater angle than the first groove edge portion 20. The other one of the groove edges (the lower groove edge 9i in the Figs) of the at least one of the outer transverse grooves 9 has a third groove edge portion 22 extending smoothly in the tire axial direction and a fourth groove edge portion 23 connected with the third groove edge portion 22 and inclined toward the groove center line 9c at a greater angle than the third groove edge portion 22. With the groove edges 9e and 9i configured as such, the edge components are increased and a frictional force on a snowy road is increased, therefore, the on-snow performance can be improved.

The first groove edge portion 20 in this embodiment includes a first axial direction portion 20a connecting between the outside tread edge (To) and the second groove edge portion 21, and a second axial direction portion 20b extending from the second groove edge portion 21 to at least the outer shoulder main groove 3. The third groove edge portion 22 in this embodiment includes a third axial direction portion 22a connecting between the outside tread edge (To) and the fourth groove edge portion 23, and a fourth axial direction portion 22b extending from the fourth groove edge portion 23 to at least the outer shoulder main groove 3. The outer transverse grooves 9 configured as such can suppress a decrease in rigidity of the outer shoulder land region 7A.

The second groove edge portion 21 and the fourth groove edge portion 23 in this embodiment are misaligned in the tire axial direction. Thereby, the rigidity of the outer shoulder land region 7A in the tire axial direction is maintained at a higher level, therefore, the steering stability is secured. The second groove edge portion 21 in this embodiment is provided on the side of the outside tread edge (To) of the outer circumferential narrow grooves 10. The fourth groove edge portion 23 in this embodiment is provided on the side of the tire equator C of the outer circumferential narrow grooves 10. Thereby, the above-described effects are effectively exerted.

Each of the outer transverse grooves 9 extends through one of intersections 3C where the first portions 3A and the second portions 3B of the outer shoulder main groove 3 intersect. Thereby, snow in the intersections 3C, which is difficult to be discharged, can be discharged smoothly from the outer transverse grooves 9 by using the ground contact pressure.

The outer circumferential narrow grooves 10 in this embodiment include first oblique portions 10a inclined to one side with respect to the tire circumferential direction and second oblique portions 10b inclined to the opposite direction to the first oblique portions 10a. Both the first oblige portions 10a and the second oblige portions 10b extend straight. The outer circumferential narrow grooves 10 configured as such promote deformation of the outer shoulder blocks 8A upon contacting with the ground and therefore can smoothly discharge the snow in the outer portions 15 while suppressing excessive decrease in the rigidity of the outer shoulder blocks 8A. In order to effectively exert such effects, it is preferred that a length Lc of the first oblique portions 10a in the tire circumferential direction and a length Lb of the second oblique portions 10b in the tire circumferential direction are not less than 30% of a maximum length L1 (shown in FIG. 1) of the outer shoulder blocks 8A in the tire circumferential direction.

Figure 4:
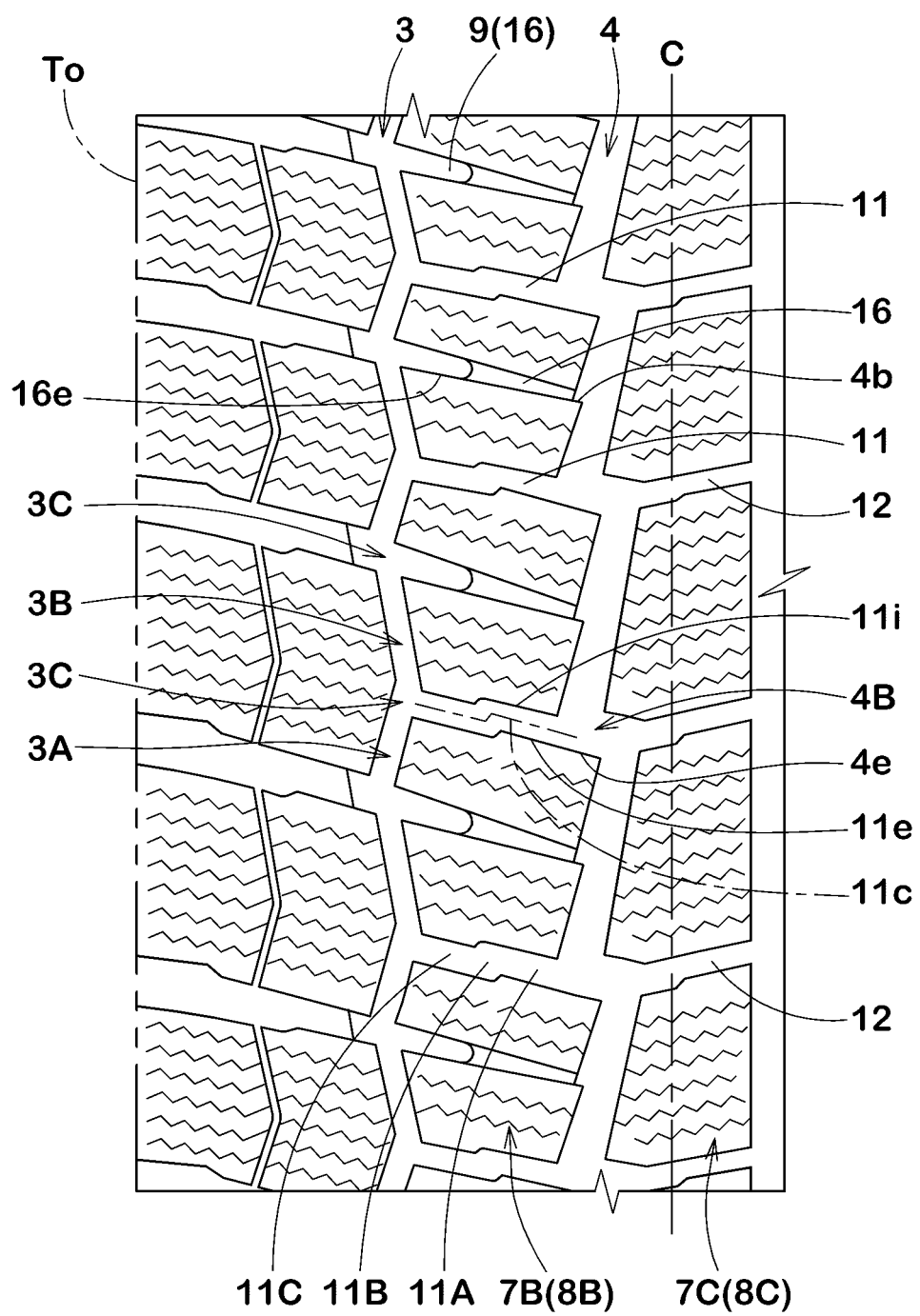
FIG. 4 is an enlarged view of the outside tread portion in FIG. 1.

As shown in FIG. 4, the outer middle land region 7B is provided with a plurality of outer middle transverse grooves 11 connecting between the outer shoulder main groove 3 and the outer crown main groove 4. Thereby, the outer middle land region 7B includes outer middle blocks 8B, each defined between adjacent ones of the outer middle transverse grooves 11, arranged in the tire circumferential direction.

The outer middle transverse grooves 11 are each connected with one of the intersections 3C between the first portions 3A and the second portions 3B and one of the short side portions 4B. The outer middle transverse grooves 11 configured as such suppress a decrease in the rigidity of the outer middle land region 7B, and therefore maintain the steering stability at a high level.

In order to effectively exert the above-described effects, the outer middle transverse grooves 11 are inclined to the same direction as the inner portions 16 of the outer transverse grooves 9 with respect to the tire axial direction.

The outer middle transverse grooves 11 are inclined to one side with respect to the tire axial direction. The outer middle transverse grooves 11 configured as such suppress a decrease in the rigidity of the outer middle land region 7B and therefore maintain the steering stability at a high level. "Inclined to one side with respect to the tire axial direction" means that not less than 80% of the entire length of a groove center line 11c of each of the outer middle transverse grooves 11 extends obliquely to one side. The groove center lines 11c of the outer middle transverse grooves 11 are each represented by a line segment smoothly connecting intermediate positions of a length in the tire circumferential direction between a pair of groove edges 11e and 11i extending in the tire axial direction.

At least one of the outer middle transverse grooves 11 includes a first transverse groove portion 11A, a second transverse groove portion 11B, and a third transverse groove portion 11C. The first transverse groove portion 11A is connected with the outer crown main groove 4 and is inclined to one side with respect to the tire axial direction. The second transverse groove portion 11B is connected with the first transverse groove portion 11A and is inclined to the opposite direction to the first transverse groove portion 11A. The third transverse groove portion 11C is connected with the second transverse groove portion 11B and is inclined to the same direction as the first transverse groove portion 11A. The at least one of the outer middle transverse grooves 11 configured as such can firmly compress the snow and thus can form a solid snow block, therefore, the on-snow performance can be improved.

One of the groove edges 11e and 11i (the groove edges 11e in this embodiment) extending in the tire axial direction of the outer middle transverse grooves 11 are smoothly connected with groove edges 4e of the short side portions 4B. Thereby, one groove-like body is formed by one of the outer middle transverse grooves 11 and one of the short side portions 4B, therefore, a large shearing force is exerted. One straight groove edge is formed by one of the groove edges 11e of the outer middle transverse grooves 11 and one of the groove edges 4e of the short side portions 4B in this embodiment.

At least one of the inner portions 16 of the outer transverse grooves 9 extends across the entire width of one of the outer middle blocks 8B. The at least one of the inner portions 16 configured as such makes it easy for the one of the outer middle blocks 8B to deform upon contacting with the ground and smoothly discharges the snow in the groove.

At least one of the inner portions 16 in this embodiment has the groove edge 16e extending in the tire axial direction and smoothly connected with one of the short edge portions 4b of the long side portions 4A. Thereby, the rigidity of the outer middle blocks 8B is maintained at a high level. The one of the short edge portion 4b and the groove edge 16e of the at least one of the inner portion 16 in this embodiment are formed in a straight line.

As described above, in the outer middle land region 7B in this embodiment, the outer middle transverse grooves 11 and the inner portions 16 extend toward the tire equator C from the intersections 3C between the first portions 3A and the second portions 3B of the outer shoulder main groove 3. Thereby, snow in the intersections 3C which is difficult to be discharged easily moves into the outer middle transverse grooves 11 and the outer transverse grooves 9 due to ground contact pressure, therefore, it is smoothly discharged.

The crown land region 7C is provided with a plurality of crown transverse grooves 12 connecting the outer crown main groove 4 and the inner crown main groove 5. Thereby, in the crown land region 7C, crown blocks 8C, each defined between adjacent ones of the crown transverse grooves 12, are arranged in the tire circumferential direction.

The crown transverse grooves 12 are inclined to the opposite direction to the outer middle transverse grooves 11. Thereby, opposite lateral forces generated in the crown transverse grooves 12 and the outer middle transverse grooves 11 are canceled out, therefore, the steering stability is improved.

At least one of the crown transverse grooves 12 is connected smoothly with one of the short side portions 4B. Thereby, one groove-like body is formed by the at least one of the crown transverse grooves 12, the one of the short side portions 4B and one of the outer middle transverse grooves 11, therefore, a larger snow block can be formed.

As shown in FIG. 1, the inner middle land region 7D is provided with a plurality of inner middle transverse grooves 13 connecting between the inner crown main groove 5 and the inner shoulder main groove 6. Thereby, in the inner middle land region 7D, inner middle blocks 8D, each defined between adjacent ones of the inner middle transverse grooves 13, are arranged in the tire circumferential direction.

At least one of the inner middle transverse grooves 13 is convex toward one side (upper side in the Figure) with respect to the tire circumferential direction. The at least one of the inner middle transverse grooves 13 configured as such cancels lateral forces opposite to each other, therefore, the steering stability is improved.

It is preferred that groove widths W6 of the inner middle transverse grooves 13 are 15% to 25% of the maximum width Wn of the inner middle land region 7D. Thereby, the on-snow performance and the steering stability are improved in a good balance.

The inner shoulder land region 7E is provided with a plurality of inner shoulder transverse grooves 14 connecting between the inner shoulder main groove 6 and the inside tread edge (Ti), an inner circumferential narrow grooves 25 each connecting a different pair of the inner shoulder transverse grooves 14 adjacent to each other in the tire circumferential direction. Thereby, the inner shoulder land region 7E is provided with inner shoulder blocks 8E, each defined between adjacent ones of the inner shoulder transverse grooves 14, arranged in the tire circumferential direction.

Groove widths W7 of the inner shoulder transverse grooves 14 gradually increase toward the inside tread edge (Ti). Thereby, snow in the inner shoulder transverse grooves 14 is smoothly discharged from the inside tread edge (Ti).

At least one of the inner shoulder transverse grooves 14 in this embodiment includes a first inner portion 14A, a second inner portion 14B, and a third inner portion 14C. The first inner portion 14A is connected with the inner shoulder main groove 6. The second inner portion 14B is disposed on the side of the inside tread edge (Ti) of the first inner portion 14A and has a larger groove width than the first inner portion 14A. The third inner portion 14C is disposed between the second inner portion 14B and the inside tread edge (Ti) and has a larger groove width than the second inner portion 14B. Each of the first inner portion 14A, the second inner portion 14B, and the third inner portion 14C extends in its longitudinal direction with a substantially constant width. The at least one of the inner shoulder transverse grooves 14 configured as such maintains the rigidity of the inner shoulder land region 7E at a high level.

The inner circumferential narrow grooves 25 in this embodiment extend straight. The inner circumferential narrow grooves 25 configured as such maintain the rigidity of the inner shoulder blocks 8E at a high level. The inner circumferential narrow grooves 25 in this embodiment has a groove width Wb of about 1.2 to 1.8 mm and a groove depth (not shown in the Figs) of about 1.5 to 2.5 mm.

While detailed description has been made of the tire of the present invention, it goes without saying that the present invention can be embodied in various forms without being limited to the illustrated specific embodiments described above.

Working Example

Tires of size 205/55R16 having the tread pattern shown in FIG. 1 were made by way of test according to the specification listed in Table 1, and each of the test tires was tested for the on-snow performance and the steering stability. Common specifications of the test tires and testing methods are as follows.
Tread width: 180 mm
Groove width of each of the main grooves: 9.5 mm
Maximum width Ws of outer shoulder land region/TW: 25%

Comparative Example (Reference) and Working Examples (Examples)

Test methods are as follows.
<On-Snow Performance and Steering Stability>
Each of the test tires was mounted on all wheels of a rear-wheel-drive car with displacement of 2000cc under the following conditions.
Rim (all wheels): 16×7.0
Tire pressure (all wheels); 210 kPa
Then, the test driver drove the test car on a dry test course and a test course covered with snow respectively, and the driver evaluated the running characteristics relating to the traction performance, the brake performance, and the cornering performance during driving. The results are indicated by an evaluation point based on the comparative example 1 being 100, wherein the larger numeric value is better.
Test results are shown in Table 1.

TABLE 1

Figure 5:
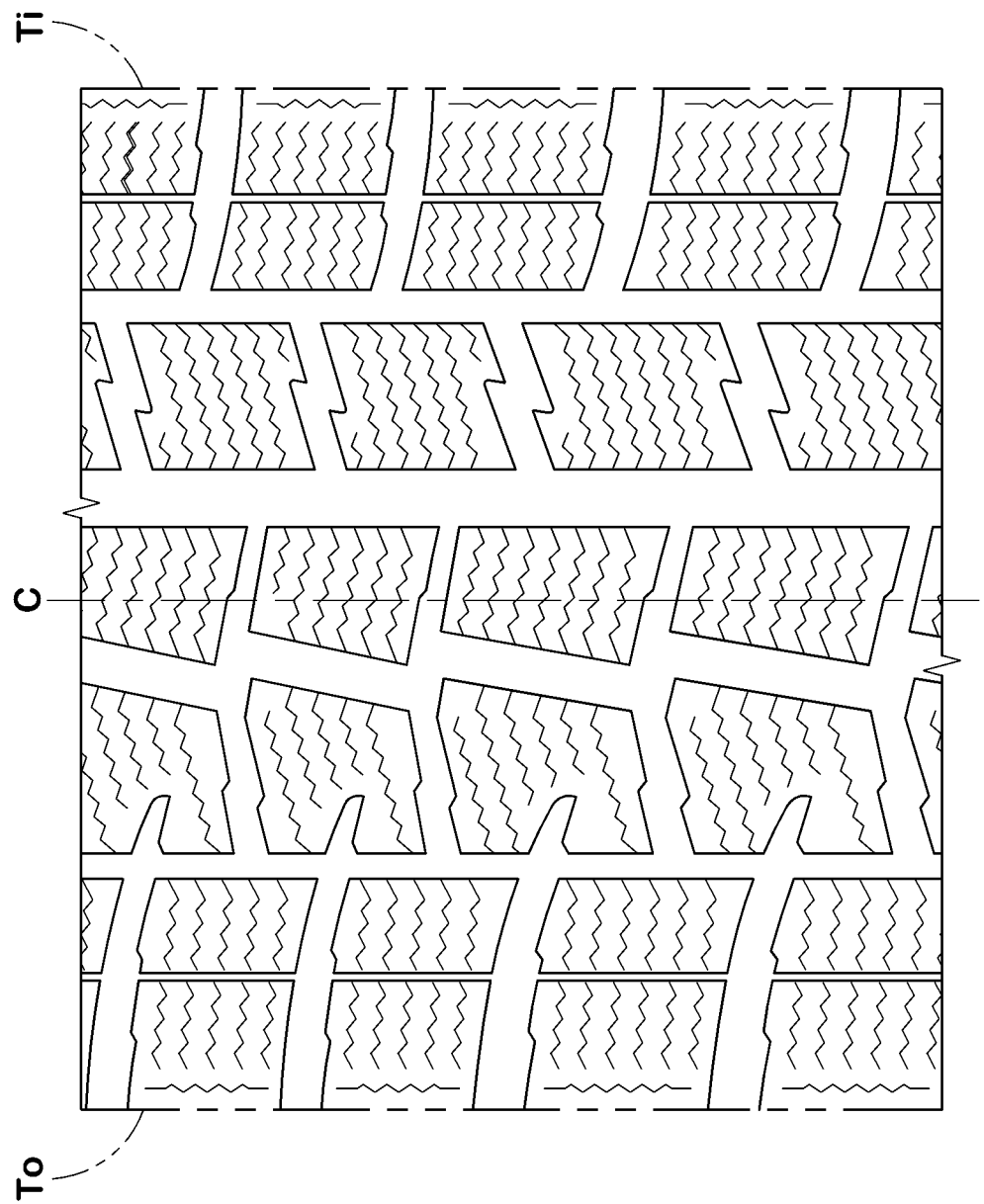
FIG. 5 is a development view of the tread portion of a tire as a conventional example.

| | Conventional Ex. 1 | Ref. 1 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|---|
| Figure showing tread pattern | FIG. 5 | FIG. 1 | FIG. 1 | FIG. 1 | FIG. 1 | FIG. 1 | FIG. 1 | FIG. 1 | FIG. 1 | FIG. 1 | FIG. 1 | FIG. 1 | FIG. 1 | FIG. 1 |
| Maximum width Wm of Outer middle land region/Ws [%] | 70 | 110 | 65 | 70 | 85 | 90 | 75 | 75 | 75 | 75 | 75 | 75 | 75 | 75 |
| Axial length La of Shallow Bottom portion/Wm [%] | — | 50 | 50 | 50 | 50 | 50 | 35 | 40 | 60 | 65 | 50 | 50 | 50 | 50 |
| Groove depth D3 of Shallow bottom portion/D4 [%] | — | 30 | 30 | 30 | 30 | 30 | 30 | 30 | 30 | 30 | 15 | 20 | 40 | 45 |
| Steering stability [evaluation point: larger is better] | 105 | 100 | 117 | 120 | 120 | 113 | 114 | 120 | 120 | 122 | 121 | 120 | 120 | 114 |

TABLE 1-continued

| | Conventional Ex. 1 | Ref. 1 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|---|
| On-snow performance [evaluation point: larger is better] | 90 | 100 | 108 | 110 | 110 | 113 | 113 | 110 | 110 | 106 | 106 | 110 | 110 | 114 |

From the test results, it can be confirmed that the tires as the working examples (examples) were improved in the performances in a good balance compared with the conventional example and the comparative example (reference). Further, test tires of a different size were tested, and the same results were obtained.

The invention claimed is:

1. A tire comprising a tread portion having a designated mounting direction to a vehicle to define an outside tread edge located toward the outside of the vehicle when the tire is mounted on the vehicle and an inside tread edge located toward the inside of the vehicle when the tire is mounted on the vehicle, wherein, the tread portion is provided with an outer shoulder main groove extending continuously in the tire circumferential direction in a part closest to the outside tread edge, an outer crown main groove extending continuously in the tire circumferential direction on a side of the inside tread edge of the outer shoulder main groove, a plurality of outer transverse grooves connecting between the outside tread edge and the outer crown main groove, an outer shoulder land region defined between the outside tread edge and the outer shoulder main groove, and an outer middle land region defined between the outer shoulder main groove and the outer crown main groove, a maximum width of the outer shoulder land region in the tire axial direction is larger than a maximum width of the outer middle land region in the tire axial direction, each of the outer transverse grooves is inclined to one side with respect to the tire axial direction such that a virtual linear line inclined to the one side would extend within the outer transverse groove over the entire length of the outer transverse groove, the tread portion is further provided with a plurality of crown transverse grooves extending from the outer crown main groove toward the inside tread edge and inclined to one side with respect to the tire axial direction, and a plurality of outer middle transverse grooves connecting between the outer crown main groove and the outer shoulder main groove, the crown transverse grooves are inclined to the opposite side to the outer middle transverse grooves, the tread portion is provided with an inner crown main groove extending linearly and continuously in the tire circumferential direction on the side of the inside tread edge of the outer crown main groove, each of the crown transverse grooves extends so as to connect between the outer crown main groove and the inner crown main groove, and the outer middle transverse grooves are inclined to the same side as the outer transverse grooves with respect to the tire axial direction such that a virtual linear line inclined to the same side would extend within a respective one of the outer middle transverse grooves over the entire length of the respective outer middle transverse groove.

2. The tire according to claim 1, wherein the maximum width of the outer middle land region in the tire axial direction is in a range from 70% to 85% of the maximum width of the outer shoulder land region in the tire axial direction.

3. The tire according to claim 1, wherein, a groove width of at least one of the outer transverse grooves gradually decreases toward the inside tread edge.

4. The tire according to claim 1, wherein, at least one of the outer transverse grooves is provided with a shallow bottom portion having a smaller groove depth than the rest of the at least one of the outer transverse grooves and extending toward the outside tread edge from a position where the at least one of the outer transverse grooves is connected with the outer crown main groove.

5. The tire according to claim 1, wherein, the outer shoulder main groove has a zigzag configuration in which first portions inclined to one side with respect to the tire circumferential direction and second portions inclined to the opposite side to the first portions are arranged alternately in the tire circumferential direction, and each of the outer transverse grooves extends through one of intersections between the first portions and the second portions.

6. The tire according to claim 1, wherein, the tread portion is further provided with an inner crown main groove extending continuously in the tire circumferential direction on the side of the inside tread edge of the outer crown main groove, and an inner shoulder main groove extending continuously in the tire circumferential direction on the side of the inside tread edge of the inner crown main groove, and a groove width of the outer shoulder main groove is smaller than groove widths of the outer crown main groove, the inner crown main groove and the inner shoulder main groove.

7. The tire according to claim 1, wherein, the outer shoulder land region is divided by the plurality of the outer transverse grooves into outer shoulder blocks arranged in the tire circumferential direction, at least some of the outer shoulder blocks are each provided with an outer circumferential narrow groove connecting between a pair of the outer transverse grooves adjacently disposed to each other on both sides of each of the at least some of the outer shoulder blocks in the tire circumferential direction, the outer circumferential narrow groove comprises a first oblique portion inclined to one side with respect to the tire circumferential direction with a length not less than 30% of a maximum length of corresponding one of the some of the outer shoulder blocks in the tire circumferential direction, and a second oblique portion inclined to an opposite side to the first oblique portion with a length not less than 30% of the maximum length of the corresponding one of the some of the outer shoulder blocks in the tire circumferential direction.

8. The tire according to claim 1, wherein,
at least one of the outer transverse grooves comprises a pair of groove edges extending in the tire axial direction,
one of the pair of the groove edges comprises a first groove edge portion extending smoothly in the tire axial direction and a second groove edge portion connected with the first groove edge portion and inclined toward a groove center line of the at least one of the outer transverse grooves at a greater angle than the first groove edge portion,
the other one of the pair of the groove edges comprises a third groove edge portion extending smoothly in the tire axial direction and a fourth groove edge portion connected with the third groove edge portion and inclined toward the groove center line at a greater angle than the third groove edge portion, and
the second groove edge portion and the fourth groove edge portion are misaligned in the tire axial direction.

9. The tire according to claim 1, wherein
each of the outer transverse grooves includes an outer portion disposed between the outside tread edge and the outer shoulder main groove, and an inner portion disposed between the outer shoulder main groove and the outer crown main groove, and
in at least one of the outer transverse grooves, a groove width of the inner portion gradually and continuously decreases toward the inside tread edge.

10. The tire according to claim 1, wherein
the tread portion is further provided with an inner crown main groove extending linearly and continuously in the tire circumferential direction on the side of the inside tread edge of the outer crown main groove, and an inner shoulder main groove extending linearly and continuously in the tire circumferential direction on the side of the inside tread edge of the inner crown main groove, and
the outer shoulder main groove width is smaller than each of the groove widths of the outer crown main groove, the inner crown main groove, and the inner shoulder main groove.

11. The tire according to claim 1, wherein
each of the outer transverse grooves includes an outer portion disposed between the outside tread edge and the outer shoulder main groove, and an inner portion disposed between the outer shoulder main groove and the outer crown main groove, and
in at least one of the outer transverse grooves, a groove width of the inner portion gradually and continuously decreases toward the inside tread edge.

12. The tire according to claim 1, wherein
the tread portion is further provided with an inner crown main groove extending linearly and continuously in the tire circumferential direction on the side of the inside tread edge of the outer crown main groove, and an inner shoulder main groove extending linearly and continuously in the tire circumferential direction on the side of the inside tread edge of the inner crown main groove, and
a groove width of the outer shoulder main groove is smaller than each of groove widths of the outer crown main groove, the inner crown main groove, and the inner shoulder main groove.

13. The tire according to claim 1, wherein the outer crown main groove has a zigzag configuration in which long side portions inclined to one side with respect to the tire circumferential direction and short side portions inclined to the opposite side to the long side portions and each having a smaller length in the tire circumferential direction than that of each of the long side portions are arranged alternately in the tire circumferential direction.

14. A tire comprising a tread portion having a designated mounting direction to a vehicle to define an outside tread edge located toward the outside of the vehicle when the tire is mounted on the vehicle and an inside tread edge located toward the inside of the vehicle when the tire is mounted on the vehicle, wherein,
the tread portion is provided with an outer shoulder main groove extending continuously in the tire circumferential direction in a part closest to the outside tread edge, an outer crown main groove extending continuously in the tire circumferential direction on a side of the inside tread edge of the outer shoulder main groove, a plurality of outer transverse grooves connecting between the outside tread edge and the outer crown main groove, an outer shoulder land region defined between the outside tread edge and the outer shoulder main groove, and an outer middle land region defined between the outer shoulder main groove and the outer crown main groove,
a maximum width of the outer shoulder land region in the tire axial direction is larger than a maximum width of the outer middle land region in the tire axial direction,
each of the outer transverse grooves is inclined to one side with respect to the tire axial direction such that a virtual linear line inclined to the one side would extend within the outer transverse groove over the entire length of the outer transverse groove,
the tread portion is further provided with a plurality of crown transverse grooves extending from the outer crown main groove toward the inside tread edge and inclined to one side with respect to the tire axial direction, and a plurality of outer middle transverse grooves connecting between the outer crown main groove and the outer shoulder main groove,
the crown transverse grooves are inclined to the opposite side to the outer middle transverse grooves,
at least one of the outer middle transverse grooves includes one first transverse groove portion, one second transverse groove portion, and one third transverse groove portion,
the first transverse groove portion is connected with the outer crown main groove and is inclined to one side with respect to the tire axial direction,
the second transverse groove portion is connected with the first transverse groove portion and is inclined to the opposite side to the first transverse groove portion, and
the third transverse groove portion is connected with the second transverse groove portion and is inclined to the same side as the first transverse groove portion.

15. The tire according to claim 14, wherein the maximum width of the outer middle land region in the tire axial direction is in a range from 70% to 85% of the maximum width of the outer shoulder land region in the tire axial direction.

16. A tire comprising a tread portion having a designated mounting direction to a vehicle to define an outside tread edge located toward the outside of the vehicle when the tire is mounted on the vehicle and an inside tread edge located toward the inside of the vehicle when the tire is mounted on the vehicle, wherein, the tread portion is provided with an outer shoulder main groove extending continuously in the tire circumferential direction in a part closest to the outside tread edge, an outer crown main groove extending continuously in the tire circumferential direction on a side of the inside tread edge of the outer shoulder main groove, a plurality of outer transverse grooves connecting between the outside tread edge and the outer crown main groove, an outer shoulder land region defined between the outside tread edge and the outer shoulder main groove, and an outer middle land region defined between the outer shoulder main groove and the outer crown main groove, a maximum width of the outer shoulder land region in the tire axial direction is larger than a maximum width of the outer middle land region in the tire axial direction, each of the outer transverse grooves is inclined to one side with respect to the tire axial direction such that a virtual linear line inclined to the one side would extend within the outer transverse groove over the entire length of the outer transverse groove, the tread portion is provided with an inner shoulder main groove extending continuously in the tire circumferential direction in a part closest to the inside tread edge, an inner crown main groove extending continuously in the tire circumferential direction on a side of the outside tread edge of the inner shoulder main groove, and an inner middle land region defined between the inner shoulder main groove and the inner crown main groove, the inner middle land region is provided with a plurality of inner middle transverse grooves each connecting between the inner crown main groove and the inner shoulder main groove, and at least one of the inner middle transverse grooves is convex toward one side with respect to the tire circumferential direction.

17. The tire according to claim 16, wherein the tread portion is provided with an inner shoulder land region defined between the inner shoulder main groove and the inside tread edge, the inner shoulder land region is provided with a plurality of inner shoulder transverse grooves each connecting between the inner shoulder main groove and the inside tread edge, and a groove width of each of the inner shoulder transverse grooves gradually increase toward the inside tread edge.

18. The tire according to claim 17, wherein the inner shoulder land region is provided with inner circumferential narrow grooves each extending linearly so as to connect between a different pair of the inner shoulder transverse grooves adjacent to each other in the tire circumferential direction.

19. The tire according to claim 17, wherein at least one of the inner shoulder transverse grooves includes one first inner portion, one second inner portion, and one third inner portion, the first inner portion is connected with the inner shoulder main groove, the second inner portion is disposed on the side of the inside tread edge of the first inner portion and has a larger groove width than the first inner portion, the third inner portion is disposed between the second inner portion and the inside tread edge and has a larger groove width than the second inner portion, and each of the first inner portion, the second inner portion, and the third inner portion extends in its longitudinal direction with a substantially constant width.

* * * * *